(12) United States Patent
Brooks et al.

(10) Patent No.: US 11,075,379 B2
(45) Date of Patent: Jul. 27, 2021

(54) PREPARATION AND CHARACTERIZATION OF MODIFIED OXIDE COMPOSITIONS

(71) Applicant: HONDA MOTOR CO., LTD., Tokyo (JP)

(72) Inventors: Christopher Brooks, Dublin, OH (US); Eric Kreidler, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 16/356,992

(22) Filed: Mar. 18, 2019

(65) Prior Publication Data
US 2019/0214645 A1 Jul. 11, 2019

Related U.S. Application Data

(62) Division of application No. 15/617,807, filed on Jun. 8, 2017, now Pat. No. 10,319,999.
(Continued)

(51) Int. Cl.
*H01B 1/08* (2006.01)
*H01M 4/485* (2010.01)
(Continued)

(52) U.S. Cl.
CPC ........ *H01M 4/485* (2013.01); *C01G 45/1264* (2013.01); *H01B 1/08* (2013.01);
(Continued)

(58) Field of Classification Search
CPC .. H01B 1/00; H01B 1/08; H01M 4/04; H01M 4/36; H01M 4/485; H01M 4/505; C01G 45/02
See application file for complete search history.

(56) References Cited

U.S. PATENT DOCUMENTS

| | | |
|---|---|---|
| 4,200,554 A | 4/1980 | Lauder |
| 5,624,707 A | 4/1997 | Azuma et al. |

(Continued)

FOREIGN PATENT DOCUMENTS

| | | |
|---|---|---|
| EP | 0468127 A2 | 1/1992 |
| EP | 2 685 551 A1 | 1/2014 |

(Continued)

OTHER PUBLICATIONS

Peng et al "Surface Tuning of La0.5Sr0.5CoO3 perovskite catalysts . . . ", Environ. Sci. Technol. 2016, 50, 6442-6448.*
(Continued)

*Primary Examiner* — Mark Kopec
(74) *Attorney, Agent, or Firm* — Arent Fox LLP

(57) ABSTRACT

Oxide compositions comprising a modified structure which includes the formula $ABO_z$. The A component may comprise at a cation of least one element selected from the group consisting of Mg, Ca, Sr, Ba, Sc, Y, La, Ce, Pr, Nd, Gd, and Zn, and the B component may comprise a cation of at least one element selected from the group consisting of V, Cr, Mn, Fe, Co, and Ni. Batteries and supercapacitors comprising the oxide compositions of the present disclosure and methods of making the oxide compositions of the present disclosure are also provided.

31 Claims, 9 Drawing Sheets

Related U.S. Application Data

(60) Provisional application No. 62/352,364, filed on Jun. 20, 2016.

(51) Int. Cl.
  *C01G 45/12* (2006.01)
  *H01M 4/505* (2010.01)
  *H01M 4/525* (2010.01)

(52) U.S. Cl.
  CPC ........... *H01M 4/505* (2013.01); *H01M 4/525* (2013.01); *C01P 2002/72* (2013.01); *C01P 2002/76* (2013.01); *C01P 2002/82* (2013.01); *C01P 2006/40* (2013.01)

(56) References Cited

U.S. PATENT DOCUMENTS

| | | | |
|---|---|---|---|
| 5,968,330 | A | 10/1999 | Guth et al. |
| 6,770,256 | B1 | 8/2004 | Kaliaguine et al. |
| 7,713,662 | B2 | 5/2010 | Tabuchi et al. |
| 7,742,277 | B2 * | 6/2010 | Shinoda ............... H01L 28/55 361/311 |
| 7,984,977 | B2 * | 7/2011 | Takeda ............... H01L 41/1876 347/68 |
| 2012/0129689 | A1 | 5/2012 | Yoshii et al. |
| 2012/0280224 | A1 | 11/2012 | Doolittle et al. |
| 2012/0304324 | A1 | 11/2012 | McGowen |
| 2013/0078518 | A1 | 3/2013 | Thackeray et al. |
| 2014/0045082 | A1 * | 2/2014 | Taniuchi ............... H01M 4/50 429/405 |

FOREIGN PATENT DOCUMENTS

| | | |
|---|---|---|
| JP | 2006-175304 A | 7/2006 |
| JP | 2013-069680 A | 4/2013 |
| WO | WO 2012/144533 A1 | 10/2012 |

OTHER PUBLICATIONS

Aoyagi et al "Structural characterization of bismuth layered perovskite treated with acids", Key Engineering Materials, 269, pp. 181-184 (2004).*

Si et al "Selective dissolution of A-site cations in ABO3 Perovskites . . . ", Agnew. Chem. Int. Ed. 2015, 54, 7954-57.*

Kang et al "The effects of acid treatment on the electrochemical properties of 0.5 Li2MnO3-0.5 LiNi0.44Co0.25Mn0.31O2 electrodes in lithium cells", Journal of the electrochemical Society, 153, (6) A1186-1192 (2006).*

Liu et al., "MBE growth and characterization of A-site deficient, low-field magnetoresistance (Pr1-xSrx)yMnO3-gamma oriented thin films", Journal of Crystal Growth 251 (2003), pp. 619-622.

Post, J., et al., "Crystal Structure Determinations of Synthetic Sodium, Magnesium, and Potassium Bimessite using TEM and Rietveld Method" American Mineralogist, vol. 75, pp. 477-489, 1990.

Poulsen., "Defect chemistry modelling of oxygen-stoichlometry, vacancy, concentrations, and conductivity of (La1-xSrx)yMnO3+-gamma", Solid State Ionics 129 (2000), pp. 145-162.

Si et al., "Selective dissolution of A-Site cations in ABO3 Perovskites: A New Path to High-Performance Catalysts", Angew. Chem. Int. Ed. 2015, 54, pp. 7954-7957.

Studebaker et al., "Low field, room temperature magnetaresistance in (Lay-xMx)yMnO3-gamma (M=Ca, Sr) thin-films deposited by liquid delivery CVD" Materials Science and Engineering B56, (1998), pp. 168-172.

Xu et al., "Perovskite chromates cathode wth resolved and anchored nickel nano-particles for direct high-temperature steam electrolysis", Journal of Power Sources, 246 (2014) pp. 346-355.

Communication dated Mar. 16, 2021, from the Japanese Patent Office in related application No. 2017-117502.

I Arul Raj et al., Transition metal oxides based oxygen electrodes in alkaline solution-Physicochemical and electrochemical characterisation, Bulletin of Electrochemistry 6 (4)Apr. 1990, pp. 407-408.

* cited by examiner

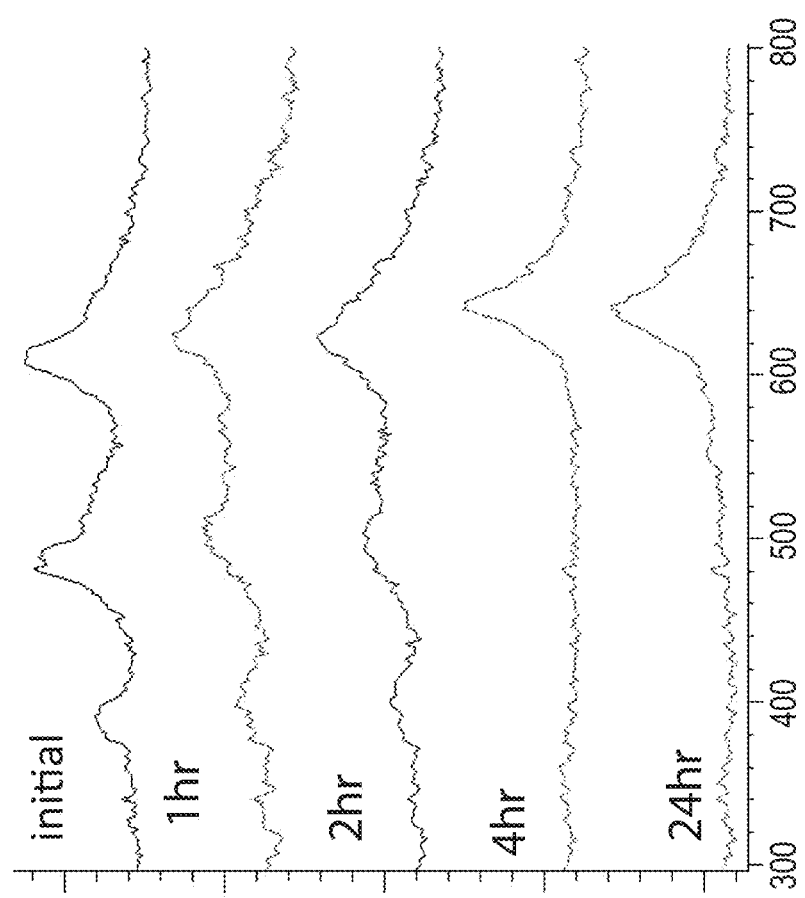

PREPARATION AND CHARACTERIZATION OF MODIFIED OXIDE COMPOSITIONS

PRIORITY INFORMATION

This application is a Divisional application of U.S. patent application Ser. No. 15/617,807, filed on Jun. 8, 2017, now issued as U.S. Pat. No. 10,319,999, which claims the benefit of U.S. Provisional Application No. 62/352,364, filed Jun. 20, 2016, the contents of which are expressly incorporated by reference herein in their entirety.

FIELD OF THE DISCLOSURE

The present disclosure is directed to oxide compositions, particularly modified oxide compositions. The present disclosure is also directed to electrochemical applications such as batteries and supercapacitors comprising modified oxides, and methods of making thereof.

BACKGROUND

In various battery and supercapacitor applications, oxides, particularly manganese oxides, have proven to be exceptionally useful due to their high charge capacity, low cost, and low toxicity. In particular, given their high charge capacity and low toxicity, manganese oxides (particularly the dioxides) have been considered a promising material for use in electrodes (for example, as a cathode component). Various forms of manganese dioxide ($MnO_2$) exist, such as the alpha ($\alpha$), beta ($\beta$) and gamma ($\gamma$) forms. These have been useful for applications in both batteries and supercapacitors.

However, $MnO_2$ in particular often exhibits poor cycling and storage capabilities, which limits its use in rechargeable electrochemical batteries. As such, there is a need in the art for modified oxide compositions, which may be useful in electrochemical applications.

SUMMARY

The present disclosure is generally directed to oxide compositions. According to some aspects, the compositions may comprise a structure which includes the formula $ABO_z$, where the A component may comprise a cation of least one element selected from the group consisting of Mg, Ca, Sr, Ba, Sc, Y, La, Ce, Pr, Nd, Gd, and Zn, and the B component may comprise a cation of at least one element selected from the group consisting of V, Cr, Mn, Fe, Co, and Ni. According to some aspects, component A may be present in a mole fraction of $X_A$, where $X_A$ ranges from 0.005 to 0.2. According to some aspects, component B may be present in a mole fraction of $X_B$, where $X_B$ ranges from 0.8 to 0.995. According to some aspects, z may be sufficient to balance the charge of the $ABO_z$ composition, and the structure may be a crystalline structure, for example, a primarily orthorhombic and/or orthorhombic based crystalline structure. According to some aspects, the present disclosure is directed to a composition comprising $YMnO_z$.

The present disclosure is also generally directed to methods of making the compositions of the present disclosure. For example, according to some aspects, the present disclosure is directed to methods of preparing a modified $ABO_z$ composition (for example, a modified $YMnO_3$ composition) as described herein.

According to some aspects, methods of the present disclosure may comprise providing a starting $ABO_z$ composition and acidic component, contacting the starting $ABO_z$ composition and the acidic component at a first time and temperature in order to remove at least some of the A and/or B component from the starting $ABO_z$ composition, thereby producing a modified $ABO_z$ composition, and heating the modified $ABO_z$ composition to a temperature which is below the phase transition temperature of the modified $ABO_z$ composition. According to some aspects, the method may optionally include isolating the modified $ABO_z$ composition. According to some aspects, for example, the method may comprise providing a starting $YMnO_3$ composition and an acidic component, contacting the starting $YMnO_3$ composition and the acidic component at first time and temperature to remove portions of both Y and Mn from the starting $YMnO_3$ composition to produce a modified $YMnO_3$ composition, heating the modified $YMnO_3$ composition to a temperature below its phase transition temperature, and optionally isolating the modified $YMnO_3$ composition.

According to some aspects, the method of preparing an oxide composition may comprise providing a starting $AA'BB'O_z$ composition, providing an acidic component, contacting the starting $AA'BB'O_z$ composition with the acidic component at a first time and temperature to remove portions of the A, A', B and B' from the starting $AA'BB'O_z$ composition, thereby producing a modified $AA'BB'O_z$ composition, heating the modified $AA'BB'O_z$ composition to a temperature below its phase transition temperature, and optionally isolating the modified $AA'BB'O_z$ composition.

The present disclosure is also generally directed to rechargeable electrochemical batteries that comprise the oxide compositions of the present disclosure. According to some aspects, the rechargeable electrochemical battery incorporates compositions of the present disclosure as electrode (e.g., cathode) material. While it is understood that the terms "anode" and "cathode" apply to each of the negative and positive electrodes depending upon whether the cell is being charged or is discharging, hereinafter the term "anode" is used to refer to the negative electrode, and the term "cathode" is used to refer to the positive electrode.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 2 shows Raman spectra showing the effect of acid on a starting $YMnO_3$ composition.

DETAILED DESCRIPTION

Figure 1:
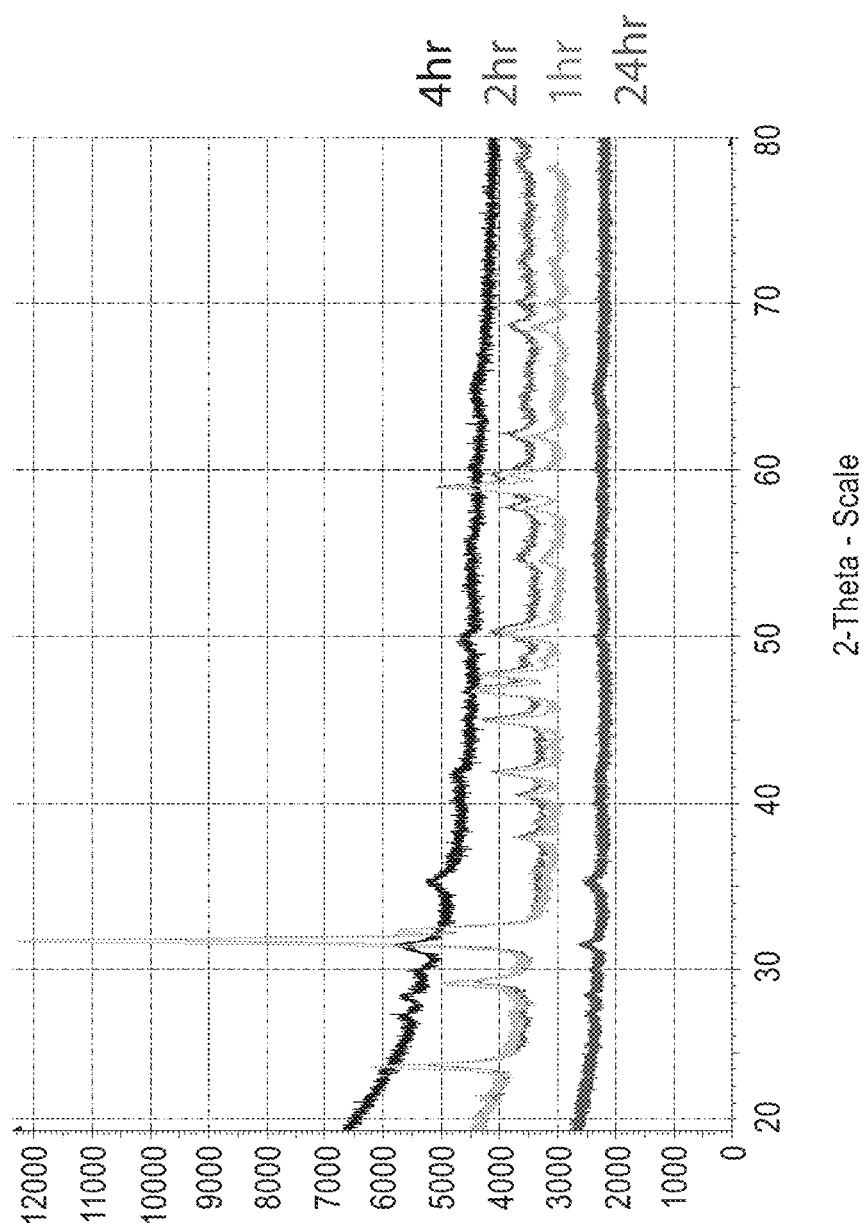
FIG. 1 shows XRD data showing the effect of acid on a starting $YMnO_3$ composition.

The present disclosure is generally directed to oxide compositions. As used herein, the term "oxide" is understood as meaning a composition comprising oxygen and another element or group of elements. According to some aspects, the present disclosure is generally directed to oxide compositions comprising a structure which includes the formula ABO$_z$, where the A component may comprise a cation of at least one element selected from the group consisting of Mg, Ca, Sr, Ba, Sc, Y, La, Ce, Pr, Nd, Gd, and Zn, and the B component may comprise a cation of at least one element selected from the group consisting of V, Cr, Mn, Fe, Co, and Ni. According to some aspects, z should be sufficient to balance the charge of the ABO$_z$ composition, and the structure may be crystalline, for example, a primarily orthorhombic and/or orthorhombic based unit cell. According to some aspects, the present disclosure is directed to a composition comprising YMnO$_z$. Precious metal additives may also be present in the composition. Examples of precious metal additives include but are not limited to those selected from the group consisting of Ru, Rh, Pd, Pt, Ag, and Au.

According to some aspects, the A component may comprise one element or a combination of elements. In an illustrative example, the A component is Y, either alone or in combination with at least one other element.

According to some aspects, the B component may comprise one element or a combination of elements, and the B component may be comprised of mixed oxidation states. In an illustrative example, the B component is Mn, where the Mn is present in a mixed oxidation state, such as Mn$^{3+}$/Mn$^{4+}$, where Mn$^{4+}$ is the predominate oxidation state. The concentration of Mn$^{3+}$ may depend at least partly on the number of Mn defects and the concentration of residual Y in the composition. As used herein, the term "defect" refers an additional or missing atom in a crystalline structure that is charge compensated by the value of O$_z$.

The present disclosure is also generally directed to methods of making the compositions described herein. For example, according to some aspects, the present disclosure is directed to methods of preparing a modified ABO$_z$ composition (for example, a modified YMnO$_3$ composition) as described herein. The A component may be present in a mole fraction of X$_A$, where X$_A$ ranges from 0.005 to 0.2, and the B component may be present in a mole fraction of X$_B$, where X$_B$ ranges from 0.8 to 0.995.

The method may comprise providing a starting ABO$_z$ composition and an acid, modifying ABO$_z$ composition by contacting the starting ABO$_z$ composition and the acid for a time at a desired temperature to remove at least some of the A and/or B component from the starting ABO$_z$ composition, thereby producing the modified ABO$_z$ composition (hereinafter referred to as "the m-ABO$_z$"), and heating the m-ABO$_z$ to a temperature which is below the phase transition temperature of the m-ABO$_z$.

According to some aspects, the step of contacting the starting ABO$_z$ composition (for example, YMnO$_3$) with the acid may remove up to 99%, optionally from about 10% to 92%, optionally from about 30% to 92%, optionally from about 40% to 92%, optionally from about 50% to 92%, and optionally 80% to 92% of the A component from the starting ABO$_z$ composition (for example, Y from the YMnO$_3$). According to some aspects, the step of contacting the starting ABO$_z$ composition (for example, YMnO$_3$) with the acid may remove a portion of the B component from the starting ABO$_z$ component. For example, the acidic interaction may remove a portion of the Mn from the starting YMnO$_3$ composition.

As used herein, the term "acid" may comprise any aqueous or non-aqueous acid to produce the m-ABO$_z$. Some illustrative examples of suitable acids include nitric, hydrochloric, sulfuric, and perchloric acids, and mixtures thereof.

The starting ABO$_z$ composition and the acid may be contacted for at least about 1 hour, preferably at least about 2 hours, more preferably at least about 3 hours, and most preferably for about 4 hours. According to some aspects, the starting ABO$_z$ composition and the acid may be contacted for about 24 hours.

FIG. 1 shows an example of the effect of acid on a starting YMnO$_3$ composition with an orthorhombic structure using X-ray powder diffraction (XRD). In particular, FIG. 1 shows XRD data for a starting YMnO$_3$ composition after being subjected to an acid component for initial, 2, 4, and 24 hours. As can be seen in FIG. 1, most of the peaks observed initially and at 2 hours are not present after 4 hours of acid exposure, indicating that the composition has been sufficiently converted to a modified YMnO$_3$ composition after 4 hours of acid treatment.

FIG. 2 shows an example of the effect of acid on a starting YMnO$_3$ composition with an orthorhombic structure using Raman spectroscopy. In particular, FIG. 2 shows a Raman spectrum for a starting YMnO$_3$ composition, in addition to spectra for the YMnO$_3$ composition after being subjected to an acid component for 1, 2, 4, and 24 hours. As can be seen in FIG. 2, the initial Raman peaks at about 380 and 480 cm$^{-1}$ disappear, and the initial peak at about 620 cm$^{-1}$ shifts to about 640 cm$^{-1}$. Notably, the similarity between the spectra at 4 and 24 hours indicates that the composition has been sufficiently converted to a modified YMnO$_3$ composition after 4 hours of acid treatment.

The starting and/or modified ABO$_z$ composition may comprise a crystalline structure. As used herein, a "crystalline structure" refers to the structure of a material, the constituents of which are arranged in an ordered arrangement. According to some aspects, the crystalline structure of the starting ABO$_z$ composition may be selected in order to optimize removal of the A component from the starting ABO$_z$ composition, as described herein. For example, the starting ABO$_z$ composition may have a primarily orthorhombic and/or orthorhombic unit cell, thereby allowing the A component to be removed from the starting $ABO_z$ composition when contacted with the acidic component to obtain the modified $ABO_z$ composition, as described herein. It will be understood that the term "orthorhombic based structure" refers to a structure comprising a spatial geometry and cell symmetry that corresponds to an orthorhombic structure, but may comprise actual geometric spacing characteristics (e.g., unit cell parameters) that differ slightly from an orthorhombic structure because of atomic composition. As used herein, the term "primarily orthorhombic and/or orthorhombic based" refers to a crystalline structure where the most prevalent atomic arrangement is orthorhombic and/or orthorhombic based. In an illustrative example, the starting $ABO_z$ composition may have a structure which is at least about 60% orthorhombic and/or orthorhombic based, preferably at least about 70%, more preferably at least about 80%, even more preferably at least about 90%, and most preferably 100%. According to some aspects, the remaining starting $ABO_z$ composition structure may comprise additional crystalline arrangements, for example, a hexagonal and/or hexagonal based structure.

It is to be understood that a variety of different synthesis methods may be used to provide the $ABO_z$ composition. In one example, Y and Mn nitrates can be combined with a solid organic acid and calcined. Although the final composition is 1:1 (Y:Mn), the starting ratio may be adjusted to optimize the reactivity with acid in forming the m-$ABO_z$ composition.

Figure 3B:
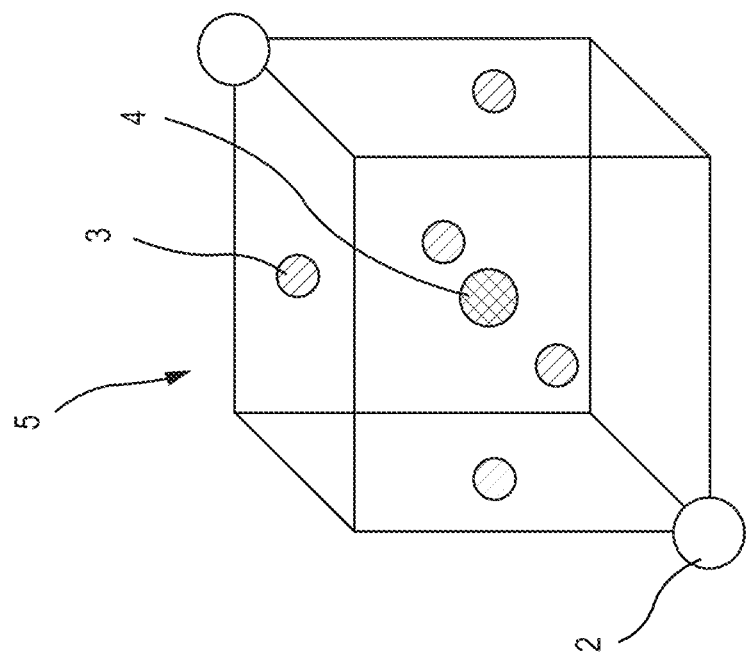
FIG. 3b shows an example of an orthorhombic unit cell of a modified $ABO_z$ composition, according to aspects of the present disclosure.
Figure 3A:
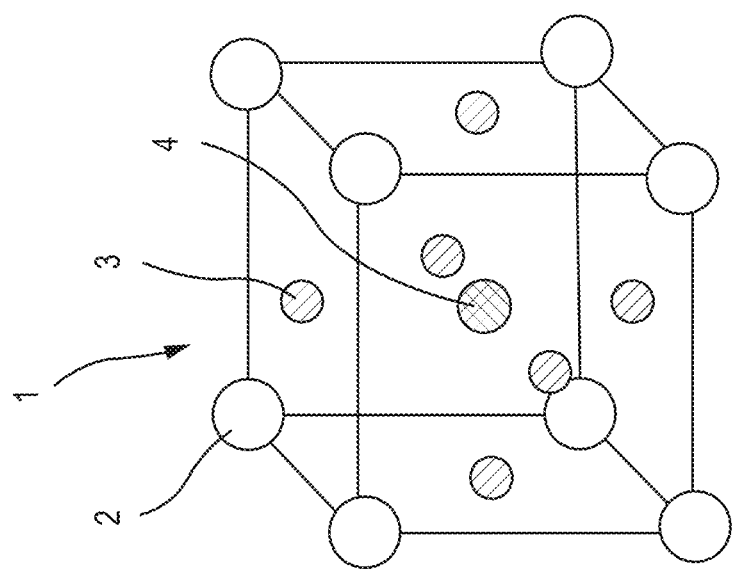
FIG. 3a shows an example of an orthorhombic unit cell of a starting $ABO_z$ composition, according to aspects of the present disclosure.

FIG. 3 shows an example $ABO_z$ unit cell according to aspects of the present disclosure. FIG. 3a shows an example unit cell of a starting $ABO_z$ composition (1) comprising the A component (2), the B component (3), and O (4). As shown in FIG. 3b, the modified $ABO_z$ composition (5) may have a similar structure as the starting $ABO_z$ composition (1) with at least a portion of the A component (2) and the B component (3) removed therefrom. Representation of the half atom in FIG. 3b indicates that a half atom is shared between two unit cells.

Figure 4:
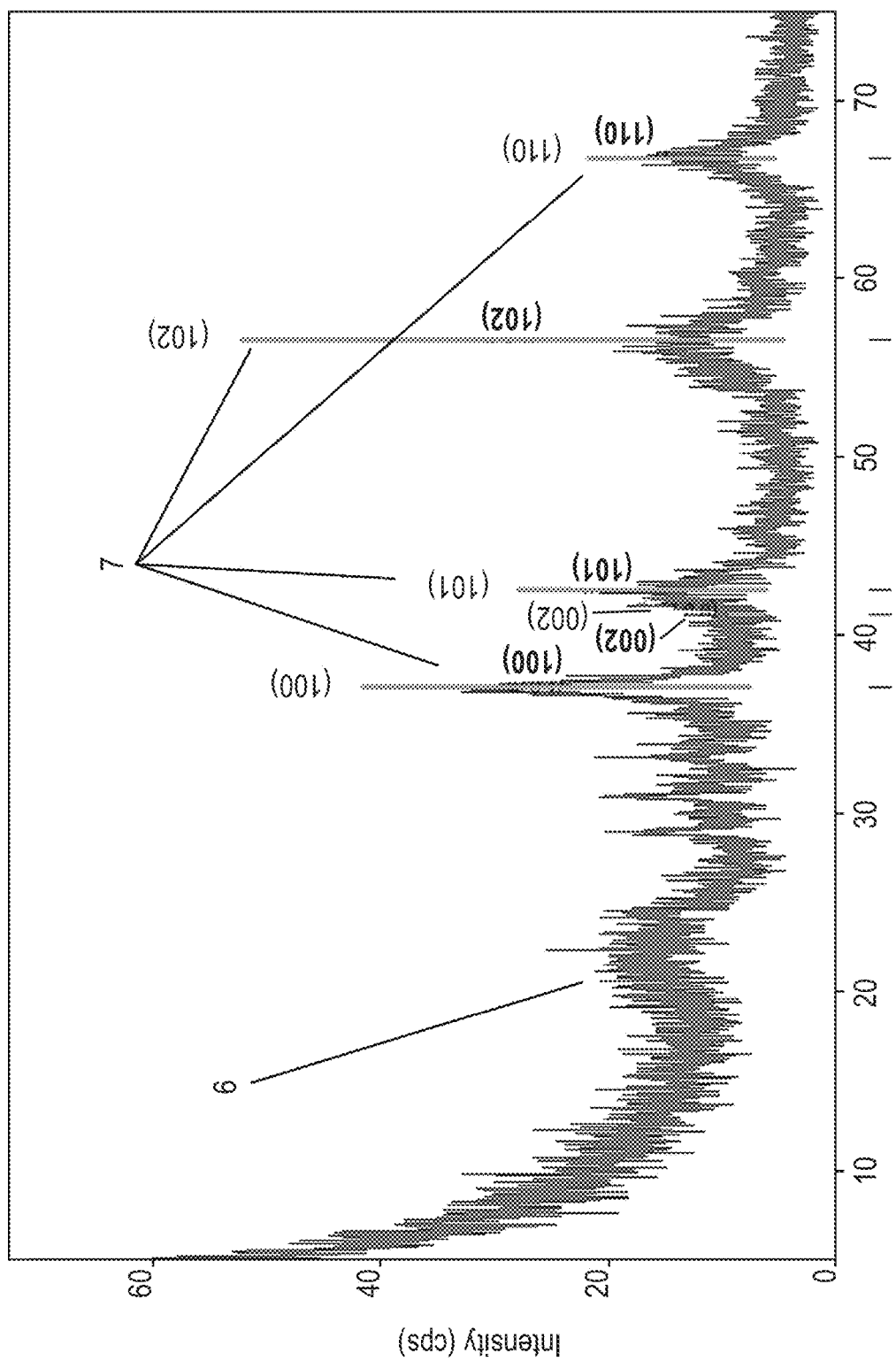
FIG. 4 shows an XRD pattern corresponding to an $ABO_z$ composition, according to aspects of the present disclosure.

As can be seen in FIG. 4, the m-$ABO_z$ composition produces an XRD pattern (6) that substantially corresponds to an XRD pattern (7) of an akhtenskite structure. Akhtenskite is a naturally occurring mineral form of ε-manganese oxide, also known as electrolytic manganese oxide. The representation of the composition shown in FIG. 3 is a modification of E-manganese oxide; the modification being the insertion of component A (e.g., Y) cations into the vacancies in $MnO_2$ layers.

According to some aspects, the starting $ABO_z$ composition may be synthesized from precursors with the A component and the B component at a mole ratio that provides a particular crystalline structure. For example, according to some aspects, the starting $ABO_z$ composition may be synthesized from precursors with the A component and the B component at a mole ratio of between about 1:1 to 1:4, preferably between about 1:1 to about 1:1.4, and more preferably from about 1:1 to 1:1.2. According to some aspects, the starting $ABO_z$ composition may be synthesized using precursors with the A component and the B component at a mole ratio of about 1:1.22, thereby resulting in a starting $ABO_z$ composition with a primarily orthorhombic and/or orthorhombic based structure, as described herein.

The phase transition temperature of the m-$ABO_z$ composition may be no greater than about 700° C., preferably no greater than about 600° C., and most preferably no greater than about 500° C.

The method may comprise a step of contacting the m-$ABO_z$ composition (e.g., the modified $YMnO_3$ composition) with a source of metallic ions. Examples of metallic ions that may interact with the m-$ABO_z$ composition include but are not limited to precious metal additives selected from the group consisting of Ru, Rh, Pd, Pt, Ag, and Au.

According to some aspects, the method of preparing a modified oxide composition may comprise providing a starting $AA'BB'O_z$ composition, providing an acidic component, contacting the starting $AA'BB'O_z$ composition with the acidic component at a first time and temperature to remove portions of the A, A', B and B' from the starting $AA'BB'O_z$ composition, thereby producing a modified $AA'BB'O_z$ composition, heating the modified $AA'BB'O_z$ composition to a temperature below its phase transition temperature, and optionally isolating the modified $AA'BB'O_z$ composition.

According to some aspects, the modified $AA'BB'O_z$ composition may be heated to a temperature that is no greater than about 650° C., preferably no greater than about 550° C., and most preferably no greater than about 450° C.

According to some aspects, any combination of the A, A', B, and B' components of the starting and/or modified $AA'BB'O_z$ composition may be excluded. For example, the method of preparing a modified $AA'BB'O_z$ composition described herein may comprise providing a starting $ABO_z$, $AA'BO_z$, $ABB'O_z$, or $AA'BB'O_z$ composition, and/or any combination thereof.

According to some aspects, the starting $AA'BB'O_z$ composition and the acidic component may be contacted for at least about 1 hour, preferably at least about 2 hours, more preferably at least about 3 hours, and most preferably for about 4 hours. According to some aspects, the starting $AA'BB'O_z$ composition and the acidic component may be contacted for about 24 hours.

According to some aspects, the A component of the $AA'BB'O_z$ composition may comprise a cation of at least one element selected from the group consisting of Mg, Ca, Sr, Ba, Sc, Y, La, Ce, Pr, Nd, Gd, and Zn. According to some aspects, the A' component of the $AA'BB'O_z$ composition may comprise a cation of at least one element selected from the group consisting of Mg, Ca, Sr, Ba, Sc, Y, La, Ce, Pr, Nd, Gd, and Zn.

According to some aspects, the B component of the $AA'BB'O_z$ composition may comprise a cation of at least one element selected from the group consisting of V, Cr, Mn, Fe, Co, and Ni. According to some aspects, the B' component of the $AA'BB'O_z$ composition may comprise a cation of at least one element selected from the group consisting of V, Cr, Mn, Fe, Co, and Ni.

According to some aspects, the compositions of the present disclosure may comprise a lattice structure capable of ion intercalation and/or interaction and/or release. For example, according to some aspects, ions may be intercalated into (and/or interact with) a lattice structure of the m-$ABO_z$ composition, where the m-$ABO_z$ composition may have, for example, a primarily orthorhombic and/or orthorhombic based crystalline structure. According to some aspects, the ion(s) may be involved in a charge transfer reaction. In this way, the m-$ABO_z$ compositions of the present disclosure may be used as, for example, an electrode in a rechargeable battery and/or capacitor material.

The present disclosure is also generally directed to batteries, such as primary lithium batteries and rechargeable lithium ion batteries, comprising the compositions of the present disclosure. For example, a rechargeable lithium ion battery may comprise a cell containing a non-aqueous solution of an ionic lithium salt or a solid polymer electrolyte. Examples of lithium salts include lithium perchlorate, lithium borohexafluoride, and any other lithium salts soluble in the electrolyte. The rechargeable lithium ion battery according to the present disclosure may also comprise a cathode which includes compositions of the present invention, where the composition is capable of both ion intercalation and release through multiple cycles of charge and discharge. According to some aspects, the rechargeable lithium ion battery may also comprise a current collector in close proximity to the external face of the cathode, and a separator, for example, a perforated or microporous organic polymer membrane that allows the passage of lithium ions there through. According to some aspects, the rechargeable electrochemical battery may also comprise an anode and/or a current collector in close proximity to the external face of the anode. According to some aspects, lithium ions may move from the anode to the cathode via the electrolyte during discharge while electrons, or electric current, flow from the component to the cathode through an outer circuit. According to some aspects, the lithium ions and the electrons may move in the opposite direction via the electrolyte or through an outer circuit, respectively, when the rechargeable electrochemical battery is recharging.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, where reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The following examples are put forth so as to provide those of ordinary skill in the art with a complete disclosure and description of how to make and use the present invention, and are not intended to limit the scope of what the inventors regard as their invention nor are they intended to represent that the experiments described below are all or the only experiments performed. Efforts have been made to ensure accuracy with respect to numbers used (e.g. amounts, dimensions, etc.) but some experimental errors and deviations should be accounted for.

EXPERIMENTAL DETAILS

Example 1: Preparation of $YMnO_3$

To a beaker was added a homogenized mixture of yttrium (III)nitrate pentahydrate, manganese (II) nitrate hexahydrate, and an organic acid, either citric acid or malic acid, at a mole ratio of approximately either 1:1.22:6 or 1:1:6 of yttrium to manganese to acid. The mixture was ramped to 350° C. over 3 hours and then held for 1 hour. Upon cooling, the material was ground to a fine powder. This powder was then ramped to 800° C. over 1 hour and for an additional 3 hours. Upon cooling, the powder was further ground to a very fine powder.

Figure 5A:
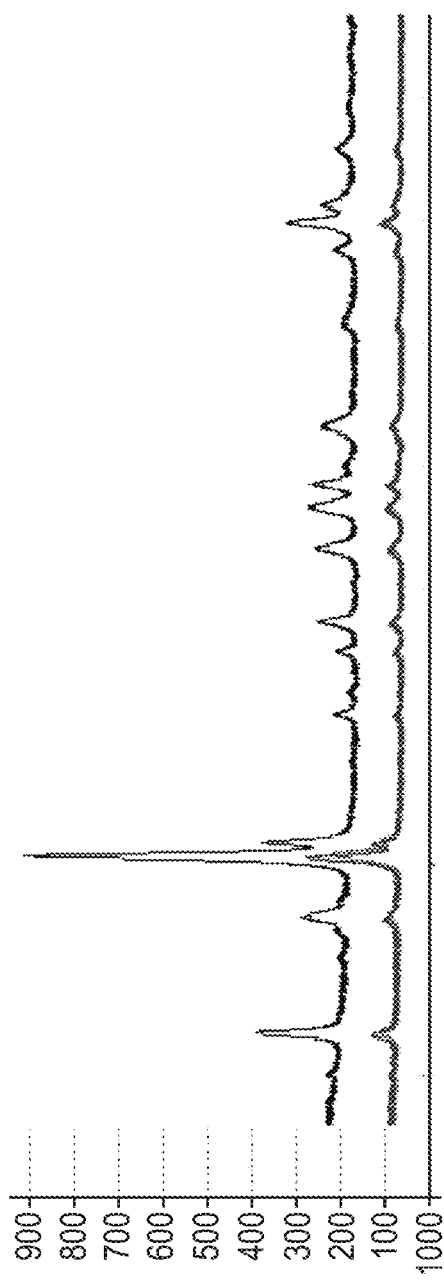
FIG. 5a shows an XRD analysis of the $YMnO_3$ powder prepared using about a 1:1.22 mole ratio of yttrium (in yttrium (III) nitrate pentahydrate) to manganese (in manganese (II) nitrate hexahydrate) according to Example 1.

FIG. 5 shows an XRD analysis of the resultant powder. In particular, FIG. 5a shows an XRD analysis of three batches produced using about a 1:1.22 mole ratio of yttrium to manganese. As shown in FIG. 5a, this mole ratio provides a consistent XRD pattern between the three batches, all of which indicate that the resultant powder yields a high percentage of orthorhombic form. In particular, each of the patterns aligns with the pattern associated with an orthorhombic structure (9), rather than the pattern associated with a hexagonal structure (8).

Figure 5B:
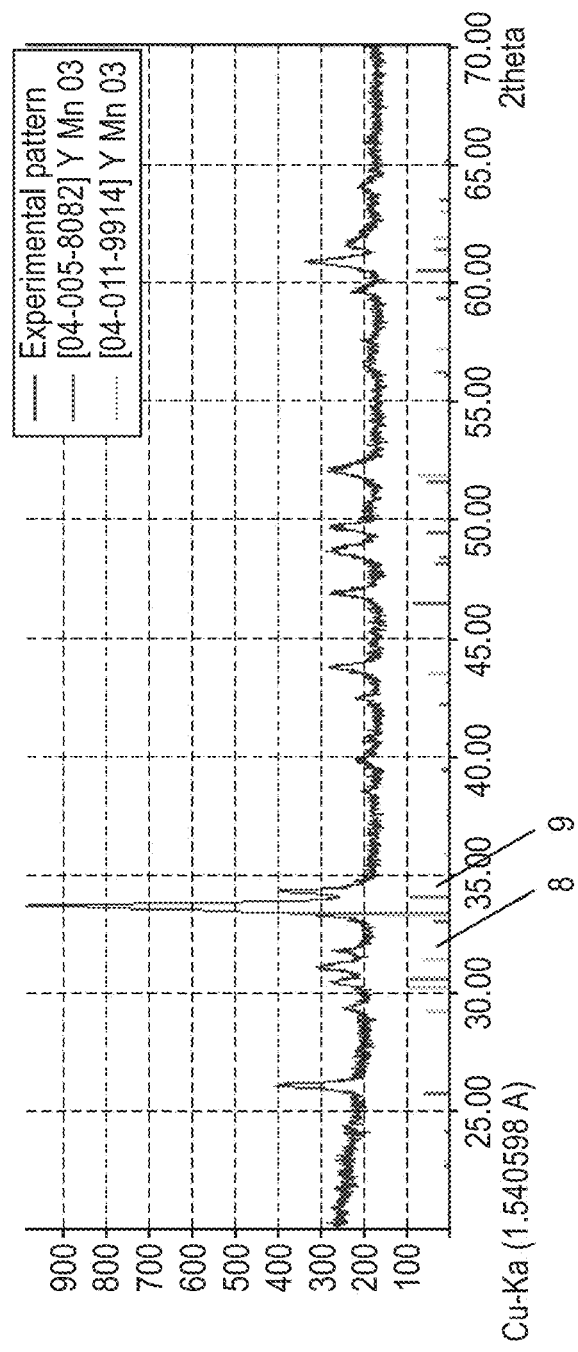
FIG. 5b shows an XRD analysis of the $YMnO_3$ powder prepared using about a 1:1 mole ratio of yttrium (in yttrium (III) nitrate pentahydrate) to manganese (in manganese (II) nitrate hexahydrate) according to Example 1.

FIG. 5b shows an XRD analysis of one batch produced using about a 1:1 mole ratio of yttrium to manganese. As shown by comparing the XRD pattern with the pattern associated with an orthorhombic structure (9) and the pattern associated with a hexagonal structure (8), FIG. 5b indicates that the resultant powder was mixed phase $YMnO_3$ in both the orthorhombic and hexagonal forms.

Example 2: Acid Treatment of $YMnO_3$

To a beaker was added 250 mg of orthorhombic $YMnO_3$ as prepared in Example 1. To this, 30 mL of 1 M nitric acid was added, and the mixture stirred at room temperature for 24 hours. The black solid was collected by filtration, washed, and dried at 120° C. in air. Individual samples was then analyzed by XRD following 1, 2, 4, and 24 hours of acid treatment.

FIG. 1 shows an XRD example of the effect of acid on the starting $YMnO_3$ composition. In particular, FIG. 1 shows an XRD pattern for the starting $YMnO_3$ composition after being subjected to nitric acid for 1, 2, 4, and 24 hours. It can be seen in FIG. 1, that most of the peaks observed following 1 and 2 hours of acid treatment are not present after 4 hours of acid exposure.

Example 3—Preparation of $LaMnO_3$

To a beaker was added lanthanum(III)nitrate pentahydrate, manganese (II) nitrate hexahydrate, and an organic acid, either citric acid or malic acid, in a 1:1:6 mole ratio. The mixture was ramped to 350° C. over 3 hours and then held for 1 hour. Upon cooling, the material was ground to a fine powder. This powder was then ramped to 800° C. over 1 hour and for an additional 3 hours. Upon cooling, the powder was further ground to a very fine powder.

Figure 6:
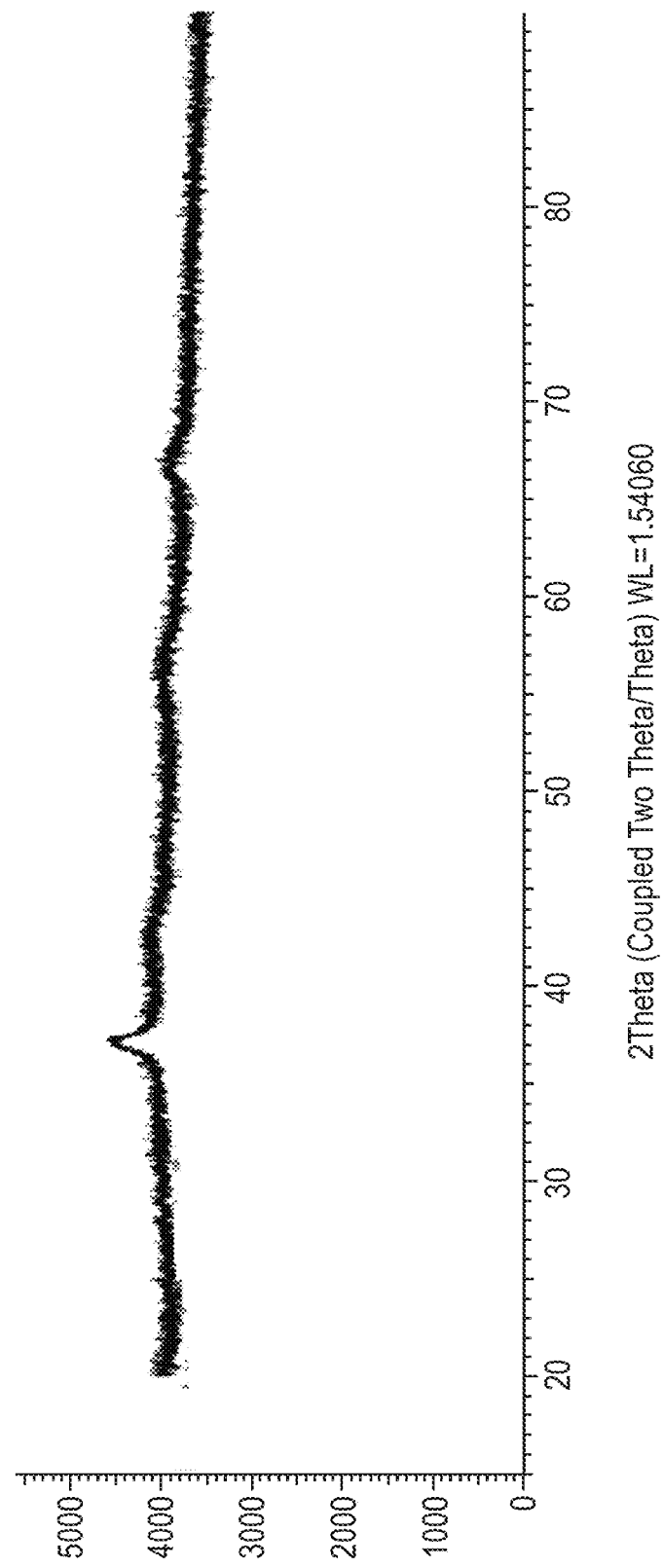
FIG. 6 shows XRD data for the acid treated LaMnO$_3$ composition according to Example 4.

FIG. 6 shows the XRD pattern of the isolated solid.

Example 4—Acid Treatment of $LaMnO_3$

To a beaker was added 250 mg of $LaMnO_3$ as prepared in Example 3. at room temperature. To this, 30 mL of 1 M nitric acid was added, and the mixture stirred at room temperature for 8 hours. The black solid was collected by filtration, washed, and dried at 120° C. in air FIG. 6 shows XRD data for the acid treated $LaMnO_3$ composition. Acid treated $YMnO_3$ of Example 2 is shown for comparison.

Example 5—$YMnO_3$ as an Electrode

Modified $YMnO_3$ as prepared in Example 2 was used as electrode material in an electrochemical cell. The electrode consisted of 32.2% modified $YMnO_3$, 46.5% Ketjen black, and 21.3% LiTHION binder, on a mass basis. The electrode was evaluated through 210 complete cycles of charge and discharge.

Figure 7A:
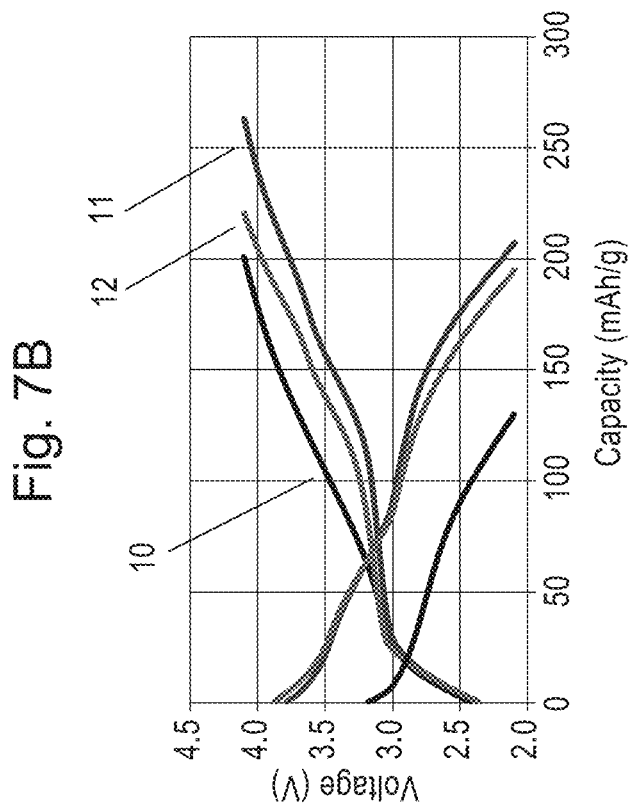
FIG. 7a shows the capacity of the YMnO$_3$-containing electrode according to Example 5 for charge and discharge for each of the 210 cycles tested.
Figure 7B:
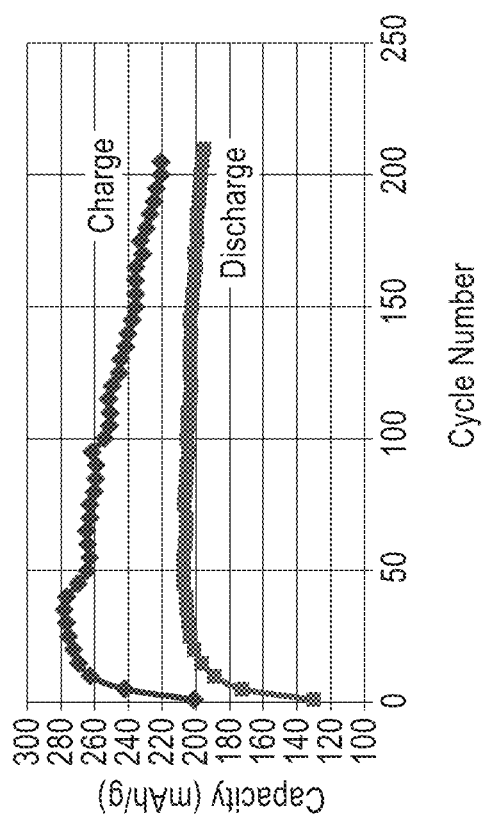
FIG. 7b shows the relationship between voltage and capacity for the YMnO$_3$-containing electrode according to Example 5.

FIGS. 7a and 7b illustrate performance characteristics of the $YMnO_3$-containing electrode. In particular, FIG. 7a shows the capacity for the electrode for charge and discharge for each cycle. FIG. 7b shows the relationship between voltage and capacity for the $YMnO_3$-containing electrode for cycle 1 (10), cycle 2 (11), and cycle 3 (12). As shown in FIG. 7, the capacity of the electrode showed a slight fade from cycles 50 to 210, while the columbic efficiency improves with the cycles.

Example 6—$LaMnO_3$ with 8 Hours Acid Treatment as an Electrode

Modified $LaMnO_3$ was prepared as described in Example 3. The resultant modified $LaMnO_3$ was used as electrode material in an electrochemical cell. The electrode was tested through 100 complete cycles of charge and discharge.

Figure 8A:
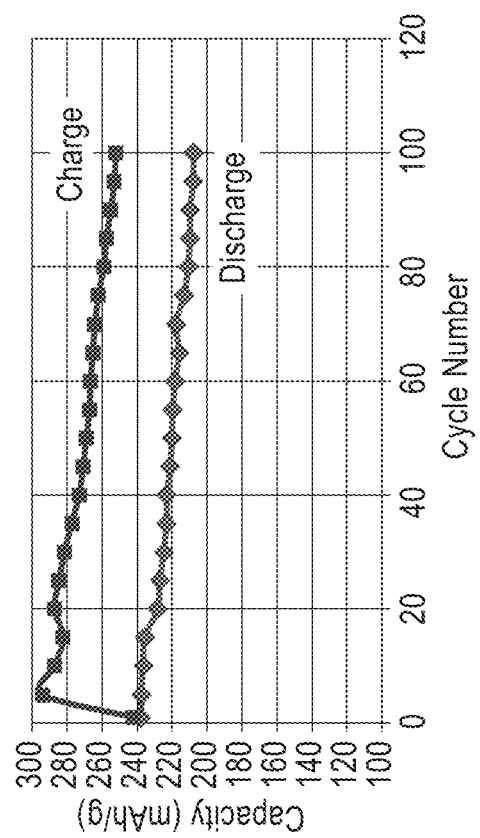
FIG. 8a shows the capacity of the LaMnO$_3$-containing electrode according to Example 7 for charge and discharge for each of the 100 cycles tested.
Figure 8B:
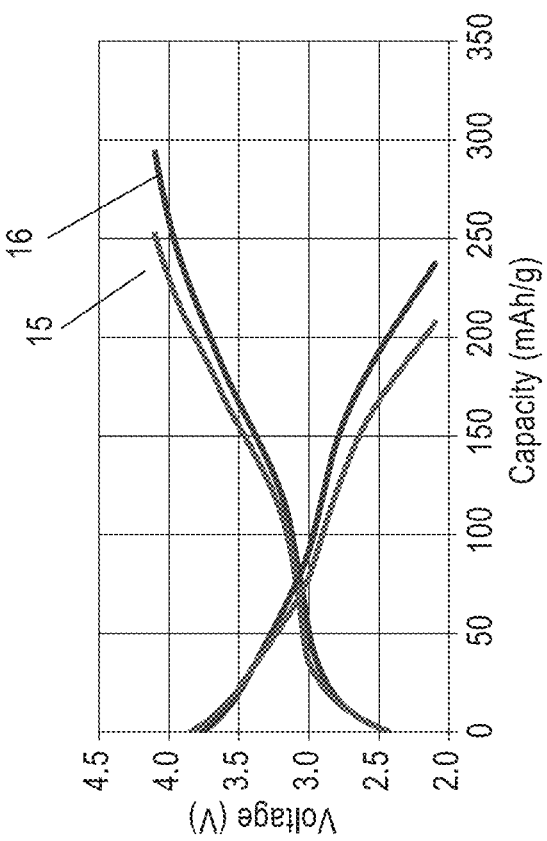
FIG. 8b shows the relationship between voltage and capacity for the LaMnO$_3$-containing electrode according to Example 7.

FIGS. 8a and 8b illustrate performance characteristics of the $LaMnO_3$-containing electrode. In particular, FIG. 8a shows the capacity for the electrode for charge and discharge for each cycle. FIG. 8b shows the relationship between voltage and capacity for the $LaMnO_3$-containing electrode for cycle 5 (16) and cycle 100 (15).

Example 7—$LaMnO_3$ with 24 Hours Acid Treatment as an Electrode

Modified $LaMnO_3$ was prepared was described in Example 3 except that the mixture was stirred for 24 hours instead of 8 hours. The resultant modified $LaMnO_3$ was used as electrode material in an electrochemical cell. The electrode was tested through 110 complete cycles of charge and discharge.

Figure 9B:
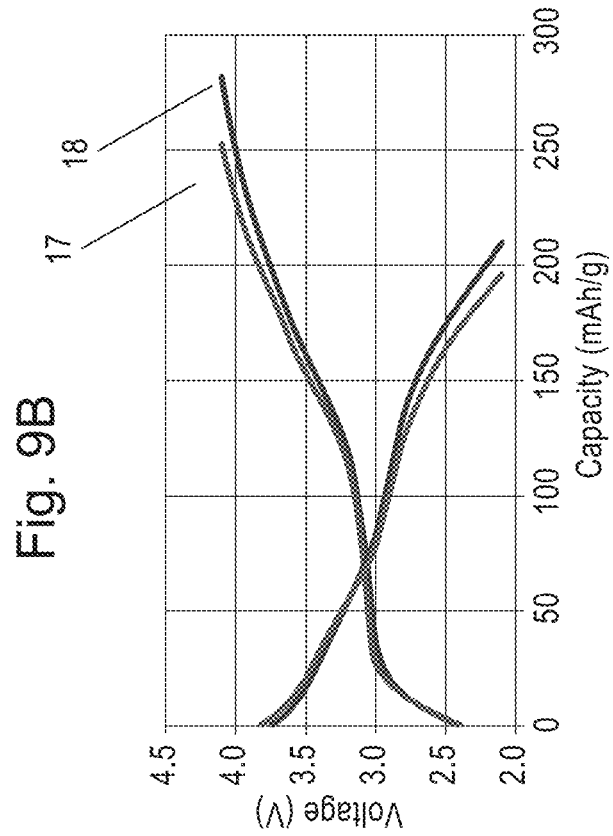
FIG. 9b shows the relationship between voltage and capacity for the LaMnO$_3$-containing electrode according to Example 8.
Figure 9A:
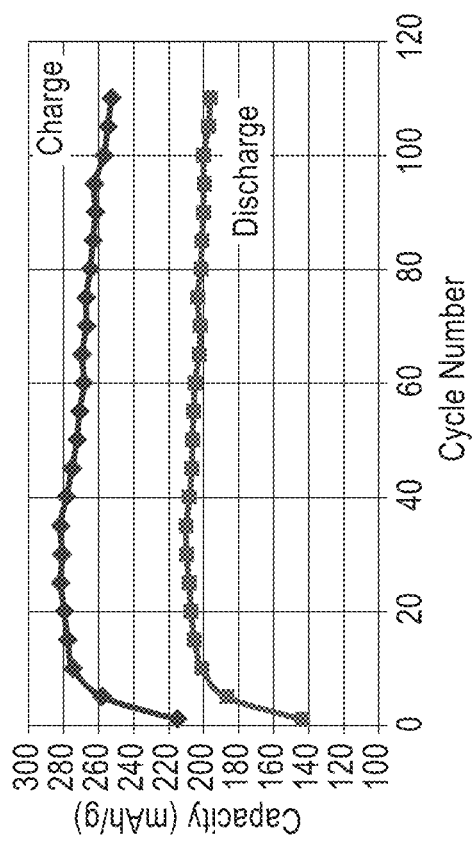
FIG. 9a shows the capacity of the LaMnO$_3$-containing electrode according to Example 8 for charge and discharge for each of the 110 cycles tested.

FIGS. 9a and 9b illustrate performance characteristics of the $LaMnO_3$-containing electrode. In particular, FIG. 9a shows the capacity for the electrode for charge and discharge for each cycle. FIG. 9b shows the relationship between voltage and capacity for the $LaMnO_3$-containing electrode for cycle 35 (18) and cycle 110 (17).

Although the foregoing description is directed to the preferred embodiments of the present teachings, it is noted that other variations and modifications will be apparent to those skilled in the art, and which may be made without departing from the spirit or scope of the present teachings.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of preparing a modified $ABO_z$-based composition comprising:
   providing a starting $ABO_z$ composition;
   providing an acidic component;
   contacting the starting $ABO_z$ composition and the acidic component at first time and temperature conditions to remove a portion of the A and a portion of the B from the starting $ABO_z$ composition to produce a modified $ABO_z$ composition; and
   heating the modified $ABO_z$ composition to a temperature below a phase transition temperature for the modified $ABO_z$ composition,
   wherein the contacting with the acidic component removes from 50% to 90% of the A from the starting $ABO_z$ composition.

2. The method according to claim 1, wherein the contacting with the acidic component removes approximately 2 A from the starting $ABO_z$ composition for every B removed from the starting $ABO_z$ composition.

3. The method according to claim 1, wherein the starting $ABO_z$ composition comprises an orthorhombic based crystalline structure.

4. The method according to claim 1, further comprising contacting the modified $ABO_z$ composition with a source of metallic ions.

5. The method according to claim 1, wherein in the modified $ABO_z$ composition, A is a cation of at least one element selected from the group consisting of Mg, Ca, Sr, Ba, Sc, Y, La, Ce, Pr, Nd, Gd and Zn, B is a cation at least one element selected from the group consisting of V, Cr, Mn, Fe, Co, and Ni, A is present in a mole fraction, $X_A$, of from 0.005 to 0.2, B is present in a mole fraction, $X_B$, of from 0.8 to 0.995, and z is sufficient to balance the charge of the $ABO_z$ composition.

6. The method according to claim 5, wherein the modified $ABO_z$ composition comprises the formula $YMnO_3$.

7. The method according to claim 5, wherein the starting $ABO_z$ composition comprises an orthorhombic based crystalline structure.

8. The method according to claim 5, wherein A is a cation of Y, and B is a cation of at least one element selected from the group consisting of V, Cr, Mn, Fe, Co, and Ni.

9. The method according to claim 1, wherein the phase transition temperature is no greater than 450° C.

10. A method of preparing a modified $AA'BB'O_z$ composition comprising:
    providing a starting $AA'BB'O_z$ composition;
    providing an acidic component;
    contacting the starting $AA'BB'O_z$ composition with the acidic component at first time and temperature conditions to remove portions of the A, A', B and B' from the starting AA'BB'O$_z$ composition to produce a modified AA'BB'O$_z$ composition; and heating the modified AA'BB'O$_z$ composition to a temperature below its phase transition temperature.

11. The method according to claim 10, wherein A comprises a cation of at least one element selected from the group consisting of Mg, Ca, Sr, Ba, Sc, Y, La, Ce, Pr, Nd, Gd and Zn, and is different from A'.

12. The method according to claim 10, wherein A' comprises a cation of at least one element selected from the group consisting of Mg, Ca, Sr, Ba, Sc, Y, La, Ce, Pr, Nd, Gd and Zn, and is different from A.

13. The method according to claim 10, wherein B comprises a cation of at least one element selected from the group consisting of V, Cr, Mn, Fe, Co, and Ni, and is different from B'.

14. The method according to claim 10, wherein B' comprises a cation of at least one element selected from the group consisting of V, Cr, Mn, Fe, Co, and Ni, and is different from B.

15. The method according to claim 10, wherein the starting AA'BB'O$_z$ composition comprises an orthorhombic based crystalline structure.

16. The method according to claim 10, wherein the heating step comprises heating to a temperature no greater than 450° C.

17. The method according to claim 10, wherein in the modified AA'BB'O$_z$ composition:

A is present in a mole fraction, $X_A$, ranging from 0.005 to 0.2,

A' is present in a mole fraction, $X_{A'}$, ranging from 0 to 0.2,

B is present in a mole fraction, $X_B$, ranging from 0.8 to 0.995,

B' is present in a mole fraction, $X_{B'}$, ranging from 0 to 0.995, and is sufficient to balance the charge of the modified AA'BB'O$_z$ composition.

18. A method of preparing a modified ABO$_z$-based composition comprising:

providing a starting ABO$_z$ composition;

providing an acidic component;

contacting the starting ABO$_z$ composition and the acidic component at first time and temperature conditions to remove a portion of the A and a portion of the B from the starting ABO$_z$ composition to produce a modified ABO$_z$ composition; and heating the modified ABO$_z$ composition to a temperature below a phase transition temperature for the modified ABO$_z$ composition, wherein the starting ABO$_z$ composition comprises an orthorhombic based crystalline structure.

19. The method according to claim 15, wherein the contacting with the acidic component removes approximately 2 A from the starting ABO$_z$ composition for every B removed from the starting ABO$_z$ composition.

20. The method according to claim 15, further comprising contacting the modified ABO$_z$ composition with a source of metallic ions.

21. The method according to claim 15, wherein in the modified ABO$_z$ composition, A is a cation of at least one element selected from the group consisting of Mg, Ca, Sr, Ba, Sc, Y, La, Ce, Pr, Nd, Gd and Zn, B is a cation at least one element selected from the group consisting of V, Cr, Mn, Fe, Co, and Ni, A is present in a mole fraction, $X_A$, of from 0.005 to 0.2, B is present in a mole fraction, $X_B$, of from 0.8 to 0.995, and z is sufficient to balance the charge of the ABO$_z$ composition.

22. The method according to claim 17, wherein the modified ABO$_z$ composition comprises the formula YMnO$_3$.

23. The method according to claim 17, wherein A is a cation of Y, and B is a cation of at least one element selected from the group consisting of V, Cr, Mn, Fe, Co, and Ni.

24. The method according to claim 15, wherein the phase transition temperature is no greater than 450° C.

25. A method of preparing a modified ABO$_z$-based composition comprising:

providing a starting ABO$_z$ composition;

providing an acidic component;

contacting the starting ABO$_z$ composition and the acidic component at first time and temperature conditions to remove a portion of the A and a portion of the B from the starting ABO$_z$ composition to produce a modified ABO$_z$ composition;

heating the modified ABO$_z$ composition to a temperature below a phase transition temperature for the modified ABO$_z$ composition; and contacting the modified ABO$_z$ composition with a source of metallic ions.

26. The method according to claim 25, wherein the contacting with the acidic component removes approximately 2 A from the starting ABO$_z$ composition for every B removed from the starting ABO$_z$ composition.

27. The method according to claim 25, wherein in the modified ABO$_z$ composition, A is a cation of at least one element selected from the group consisting of Mg, Ca, Sr, Ba, Sc, Y, La, Ce, Pr, Nd, Gd and Zn, B is a cation at least one element selected from the group consisting of V, Cr, Mn, Fe, Co, and Ni, A is present in a mole fraction, $X_A$, of from 0.005 to 0.2, B is present in a mole fraction, $X_B$, of from 0.8 to 0.995, and z is sufficient to balance the charge of the ABO$_z$ composition.

28. The method according to claim 27, wherein the modified ABO$_z$ composition comprises the formula YMnO$_3$.

29. The method according to claim 27, wherein the starting ABO$_z$ composition comprises an orthorhombic based crystalline structure.

30. The method according to claim 27, wherein A is a cation of Y, and B is a cation of at least one element selected from the group consisting of V, Cr, Mn, Fe, Co, and Ni.

31. The method according to claim 25, wherein the phase transition temperature is no greater than 450° C.

* * * * *